United States Patent
Clarke et al.

(10) Patent No.: US 10,897,475 B2
(45) Date of Patent: Jan. 19, 2021

(54) DNS METADATA-BASED SIGNALING FOR NETWORK POLICY CONTROL

(71) Applicant: Cisco Technology, Inc., San Jose, CA (US)

(72) Inventors: Joseph Michael Clarke, Raleigh, NC (US); Charles Calvin Byers, Wheaton, IL (US); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 551 days.

(21) Appl. No.: 15/673,907

(22) Filed: Aug. 10, 2017

(65) Prior Publication Data
US 2019/0052658 A1 Feb. 14, 2019

(51) Int. Cl.
*H04L 29/06* (2006.01)
*H04L 29/12* (2006.01)
*H04L 29/08* (2006.01)

(52) U.S. Cl.
CPC ...... *H04L 63/1425* (2013.01); *H04L 61/1511* (2013.01); *H04L 63/1433* (2013.01); *H04L 63/20* (2013.01); *H04L 67/18* (2013.01)

(58) Field of Classification Search
CPC . H04L 63/1425; H04L 63/1433; H04L 63/20; H04L 61/1511; H04L 67/18
See application file for complete search history.

(56) References Cited

U.S. PATENT DOCUMENTS

| | | | |
|---|---|---|---|
| 6,973,488 B1 | 12/2005 | Yavatkar et al. | |
| 7,634,809 B1 * | 12/2009 | Schneider | H04L 63/1416 726/22 |
| 7,761,570 B1 * | 7/2010 | Halley | H04L 29/12066 709/226 |
| 9,535,971 B2 * | 1/2017 | Essawi | G06F 16/283 |
| 9,736,185 B1 * | 8/2017 | Belamaric | H04L 61/1511 |
| 9,742,811 B2 * | 8/2017 | Lemon | H04L 63/0263 |
| 2004/0228335 A1 * | 11/2004 | Park | H04L 61/1511 370/352 |
| 2005/0210150 A1 * | 9/2005 | Bahl | H04L 61/2015 709/245 |
| 2007/0195800 A1 * | 8/2007 | Yang | H04L 61/2514 370/401 |

(Continued)

OTHER PUBLICATIONS

Lear et al. "Manufacturer Usage Description Specification draft-ietf-opsawg-mud-07" Network Working Group, Jul. 3, 2017, pp. 1-46.

(Continued)

*Primary Examiner* — Matthew Smithers
*Assistant Examiner* — Mirza Israr Javed
(74) *Attorney, Agent, or Firm* — Behmke Innovation Group LLC; Kenneth J. Heywood; Jonathon P. Western

(57) ABSTRACT

In one embodiment, a device in a network intercepts a Domain Name System (DNS) query sent by a node in the network to a DNS service. The device inserts metadata information about the node into the DNS query before sending the DNS query on to the DNS service. The device extracts policy information regarding the node from a DNS response sent from the DNS service back to the node in response to the DNS query. The device implements a network policy for the node within the network based on the policy information extracted from the DNS response.

20 Claims, 11 Drawing Sheets

(56) References Cited

U.S. PATENT DOCUMENTS

| | | | | |
|---|---|---|---|---|
| 2008/0112374 A1* | 5/2008 | Ramankutty | ......... | H04W 28/08 |
| | | | | 370/338 |
| 2009/0157889 A1* | 6/2009 | Treuhaft | ................ | H04L 69/22 |
| | | | | 709/230 |
| 2013/0031599 A1* | 1/2013 | Luna | .................... | H04W 12/12 |
| | | | | 726/1 |
| 2013/0173769 A1* | 7/2013 | Seastrom | ............ | H04L 61/1552 |
| | | | | 709/223 |
| 2014/0331280 A1* | 11/2014 | Porras | .................... | H04L 63/20 |
| | | | | 726/1 |
| 2015/0288721 A1* | 10/2015 | Lemon | ................ | H04L 63/1441 |
| | | | | 726/1 |
| 2016/0036762 A1* | 2/2016 | Droms | ................... | H04L 41/12 |
| | | | | 709/224 |
| 2016/0127305 A1* | 5/2016 | Droms | ................ | H04L 61/1511 |
| | | | | 709/223 |
| 2016/0164826 A1* | 6/2016 | Riedel | ................ | H04L 61/1511 |
| | | | | 709/223 |
| 2016/0323409 A1* | 11/2016 | Kolhi | ................. | H04L 61/1511 |
| 2017/0237773 A1* | 8/2017 | Wallace | ................ | H04L 63/123 |
| | | | | 726/22 |
| 2017/0339130 A1* | 11/2017 | Reddy | ................... | H04L 69/326 |
| 2017/0346853 A1* | 11/2017 | Wyatt | ................... | G06F 21/577 |
| 2019/0052658 A1* | 2/2019 | Clarke | ................ | H04L 61/1511 |

OTHER PUBLICATIONS

Cisco Umbrella; How the Cisco Umbrella roaming client for Mac OS X works at the DNS and IP layers; pp. 1-2.

Damas et al, "Extension Mechanisms for DNS (EDNS(0))" Internet Engineering Task Force (IETF); Apr. 2013, pp. 1-16.

Security At the DNS Layer with Cisco Umbrella; https://umbrella.cisco.com/use-cases/security-at-the-dns-layer; Security At the DNS Layer; pp. 1-3.

* cited by examiner

DNS METADATA-BASED SIGNALING FOR NETWORK POLICY CONTROL

TECHNICAL FIELD

The present disclosure relates generally to computer networks, and, more particularly, to a Domain Name System (DNS) metadata-based signaling for network policy control.

BACKGROUND

Network policy administration is becoming increasingly challenging for many entities. Notably, there is often a trade-off to be made between addressing security concerns and providing acceptable service to the users of the network. By way of example, many users now bring their own devices with them and expect use them on the local network. For example, a worker may connect her personal phone to her company's wireless-network while at work and expect full inside-the-firewall access privileges. In addition, users also are increasingly accessing networks remotely, such as through work-from-home programs and the like. All of these user conveniences, however, also represent additional security threats to the network.

BRIEF DESCRIPTION OF THE DRAWINGS

The embodiments herein may be better understood by referring to the following description in conjunction with the accompanying drawings in which like reference numerals indicate, identically or functionally similar elements, of which.

DESCRIPTION OF EXAMPLE EMBODIMENTS

Overview

Figure 1A:
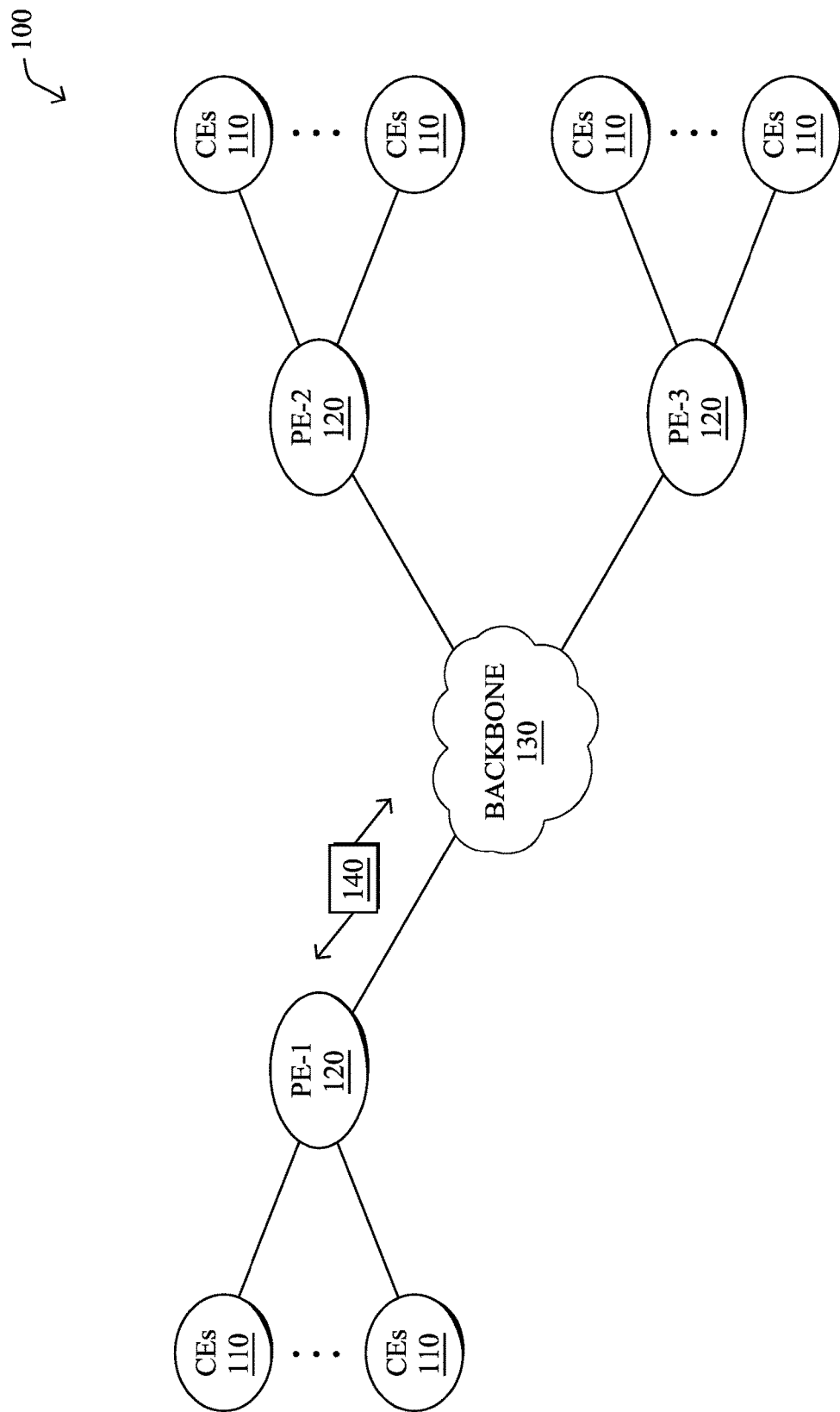
FIGS. 1A-1B illustrate an example communication network.

According to one or more embodiments of the disclosure, a device in a network intercepts a Domain Name System (DNS) query sent by a node in the network to a DNS service. The device inserts metadata information about the node into the DNS query before sending the DNS query on to the DNS service. The device extracts policy information regarding the node from a DNS response sent from the DNS service back to the node in response to the DNS query. The device implements a network policy for the node within the network based on the policy information extracted from the DNS response.

In further embodiments, a domain name system (DNS) service receives a DNS query sent by a node in a network. The DNS query includes metadata information about the node inserted into the DNS query by a device in the network. The DNS service extracts the metadata information about the node from the DNS query. The DNS service generates policy information regarding the node based on the metadata information about the node extracted from the DNS query. The DNS service includes the policy information regarding the node in a DNS response sent back to the node. The device in the network implements a network policy for the node within the network based on the policy information included in the DNS response.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network, and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" internet service connection that guarantees a certain level of performance to a customer site).

3.) Site Type C: a site of type B (e.g., types B1, 82 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
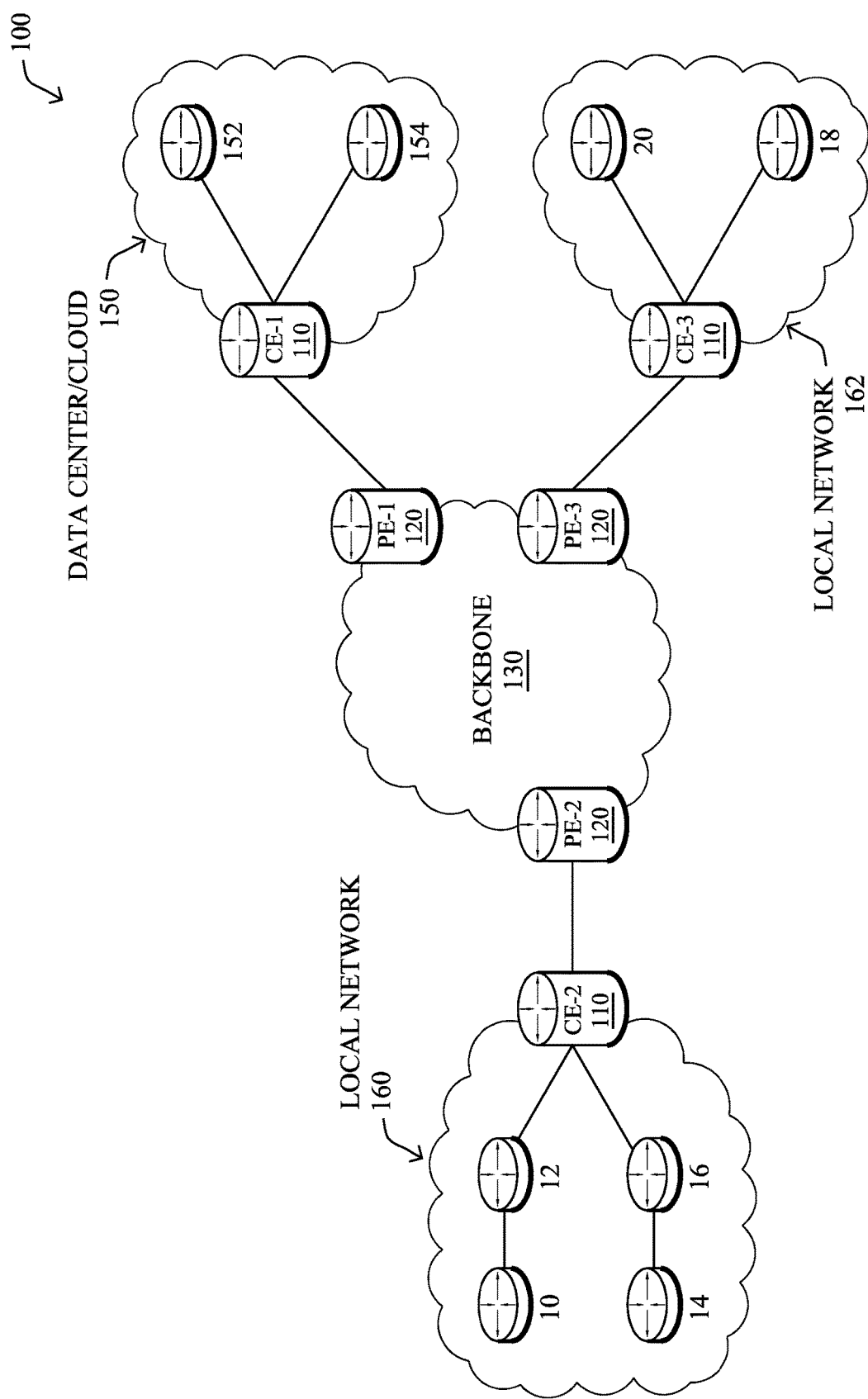

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), a software defined network (SDN) controller, an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their in interconnect are constrained; LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
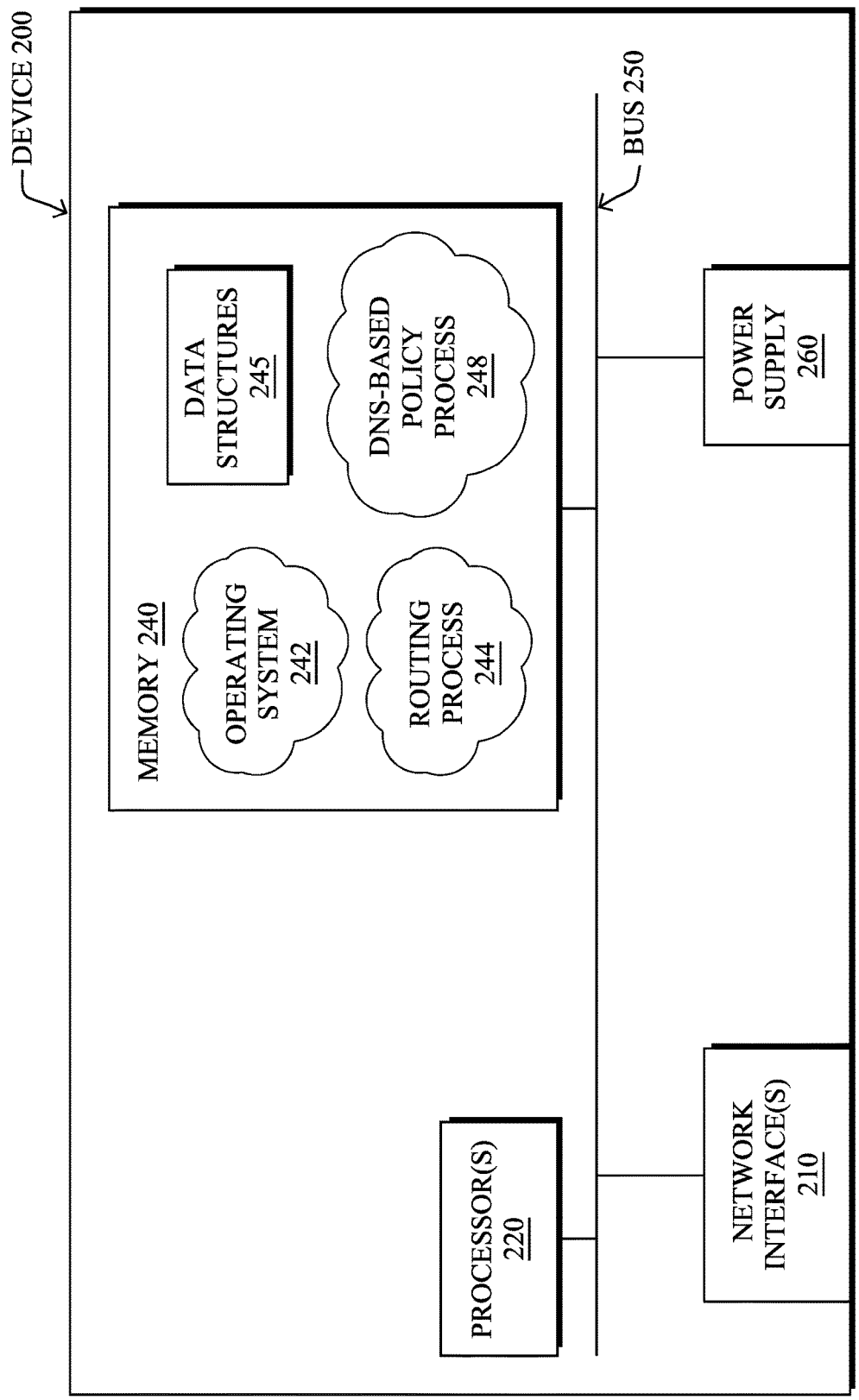
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, fog computing nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processors(s), functionally organizes the node by, inter alia, invoking network, operations in support of software processes and/or services executing on the device. These software processes/services may comprise routing process 244 (e.g., routing services) and/or illustratively, a Domain Name System (DNS)-based policy process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System. "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among devices 200 using routing protocols, such as the conventional OSPF and IS-IS link-state protocols (e.g., to "converge" to an identical view of the network topology).

DNS-based policy process 248 may include instructions executable by processor 220 to implement a network policy within a network by leveraging DNS messaging. Briefly, a DNS service operates as an index that resolves domain names to IP addresses. For example, the domain name, example-domain.test may resolve to an IP address of 192.0.2.12 within such an index. Thus, if a user of a client node wishes to visit example-domain.test, the client may first send out a DNS query to a DNS service for the IP address associated with this domain. In turn, the DNS service may return the associated IP address to the client, which can then use this address to access the service(s) of the domain (e.g., a website, etc.).

As noted above, network security and policy management is becoming increasingly difficult in many modern networks. Notably, there is an ever-growing number of different types of devices that may be attached to a network at any given time. While it may be possible to prevent access to such devices, thereby preventing new devices from joining the network, devices already on the network from roaming, etc., such an approach may not be acceptable from a user standpoint.

Given the rapid growth in network management tasks, centralization of network policies, such as security policies, quality of service (QoS) policies, and other policies that control how traffic is processed by the network, is becoming a key requirement. Notably, many deployments today rely on specialized servers and other hardware to enforce the various types of network policies. Beyond the cost associated with this hardware, network administrators may also have to configure the different network policies (e.g., security, QoS, etc.) across any number of different systems.

DNS Metadata-based Signaling for Network Policy Control

The technique herein leverage DNS messaging to provide a central control point for the identification and deployment of network policies. In some aspect, metadata regarding a network node may be inserted into a DNS query/request from the node. In turn, the DNS service may identify a network policy for the node, based on the metadata in the DNS query and include the policy information in its DNS response. This policy information can then be used by the device(s) in the network to instantiate a network policy that applies to the node and/or to the domain for which the DNS query was issued.

Specifically, according to one or more embodiments of the disclosure as described in detail below, a device in a network intercepts a Domain Name System (DNS) query sent by a node in the network to a DNS service. The DNS service processes the query to perform Domain Name resolution and also processes the metadata to insert policy information into its response. The device inserts metadata information about the node into the DNS query before sending the DNS query on to the DNS service. The device extracts policy information regarding the node from a DNS response sent from the DNS service back to the node in response to the DNS query. The device implements a network policy for the node within the network based on the policy information extracted from the DNS response.

Illustratively, the techniques described herein may be performed by hardware, software, and/or firmware, such as in accordance with the DNS-based policy process 248, which may include computer executable instructions executed by the processor 220 (or independent processor of interfaces 210) to perform functions relating to the techniques described herein, e.g., in conjunction with routing process 244.

Operationally, the techniques herein provide for the devices in a network (e.g., routers, servers, switches, firewalls, etc.) to communicate with a DNS service using DNS metadata as the conduit to signal network policy functionality in the network. In one embodiment, the metadata used for network policy signaling, both to and from the DNS service, may be conveyed in OPT pseudo-resource records (RRs), which are described in the internet Engineering Task Force (IETF) Request for Comments (RFC) 6891 entitled, "Extension Mechanisms for DNS ((EDNS(0))," by Damas, et al. However, more generally, any mechanism capable of conveying metadata in DNS messages may be used, in further embodiments. Such metadata may signal security and other network criteria in both directions, thereby enriching network visibility, pre-creating network policies, and pre-allocating network resources, as needed.

FIGS. 3A-3F illustrate an example of using Domain Name System (DNS) metadata to enforce a network policy, according to various embodiments. As shown, consider the simplified case in which a client/endpoint node A is located in local network 160. As would be appreciated, local network 160 may comprise any number of local networking nodes/devices B, such as access points, routers, switches, etc., that provide network connectivity to node A. In addition, as described previously with respect to FIG. 1B, CE router CE-2, may provide outside connectivity between the devices B of local network 160 and network 130.

During operation, assume that node A is to communicate with an endpoint node C via network 130 (e.g., the internet). For example, the user or an application of node A may wish to access a service of endpoint node C, such as a webpage, cloud service, or the like. To do so, node A may first perform a DNS lookup of the domain associated with the service of endpoint node C by issuing a DNS query 304 to a DNS server/service 302.

Generally, DNS service 302 may act as an index that relates domains to network addresses. For example, through the DNS mechanism, DNS service 302 may receive and store a network address that is associated with the domain of endpoint node C. By issuing DNS query 304 to DNS service 302 that includes the domain of endpoint C, node A can obtain the network address of endpoint node C, thereby allowing node A to begin communicating with endpoint C.

As would be appreciated, DNS service 302 can be implemented in any number of ways and that the architecture shown in FIGS. 3A-3F are for illustrative purposes only. In some cases, DNS service 302 may be a cloud-based service or operated as a particular server. However, in further cases, DNS service 302 can also be implemented closer to, or even within, local network 160. For example, DNS service 302 could also be implemented as a fog-based service, such as a service provided by networking nodes B and/or router CE-2. The query process and data flows would be similar in that case.

Figure 3A:
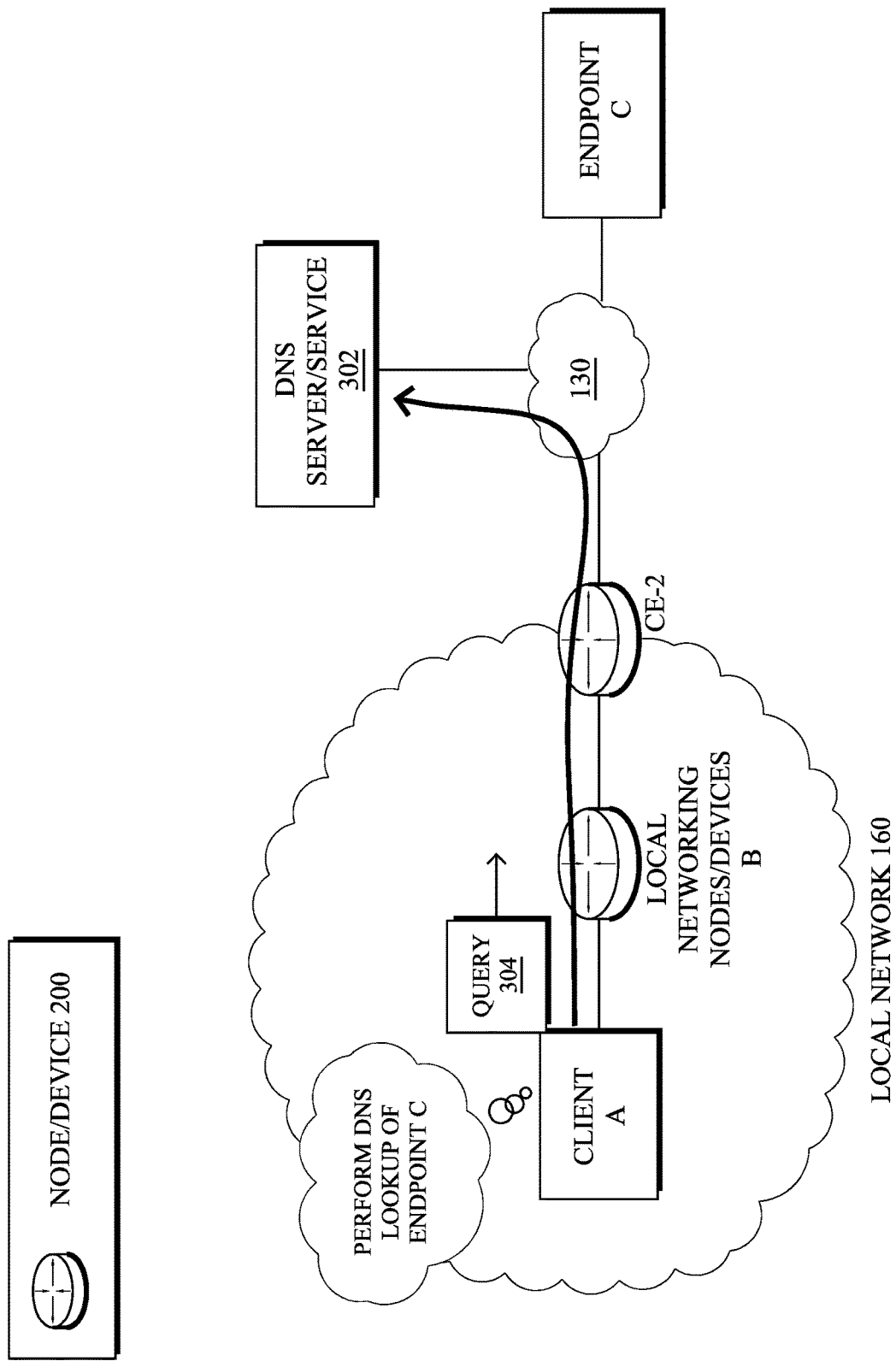
FIGS. 3A-3F illustrate an example of using Domain Name System (DNS) metadata to enforce a network policy.
Figure 3B:
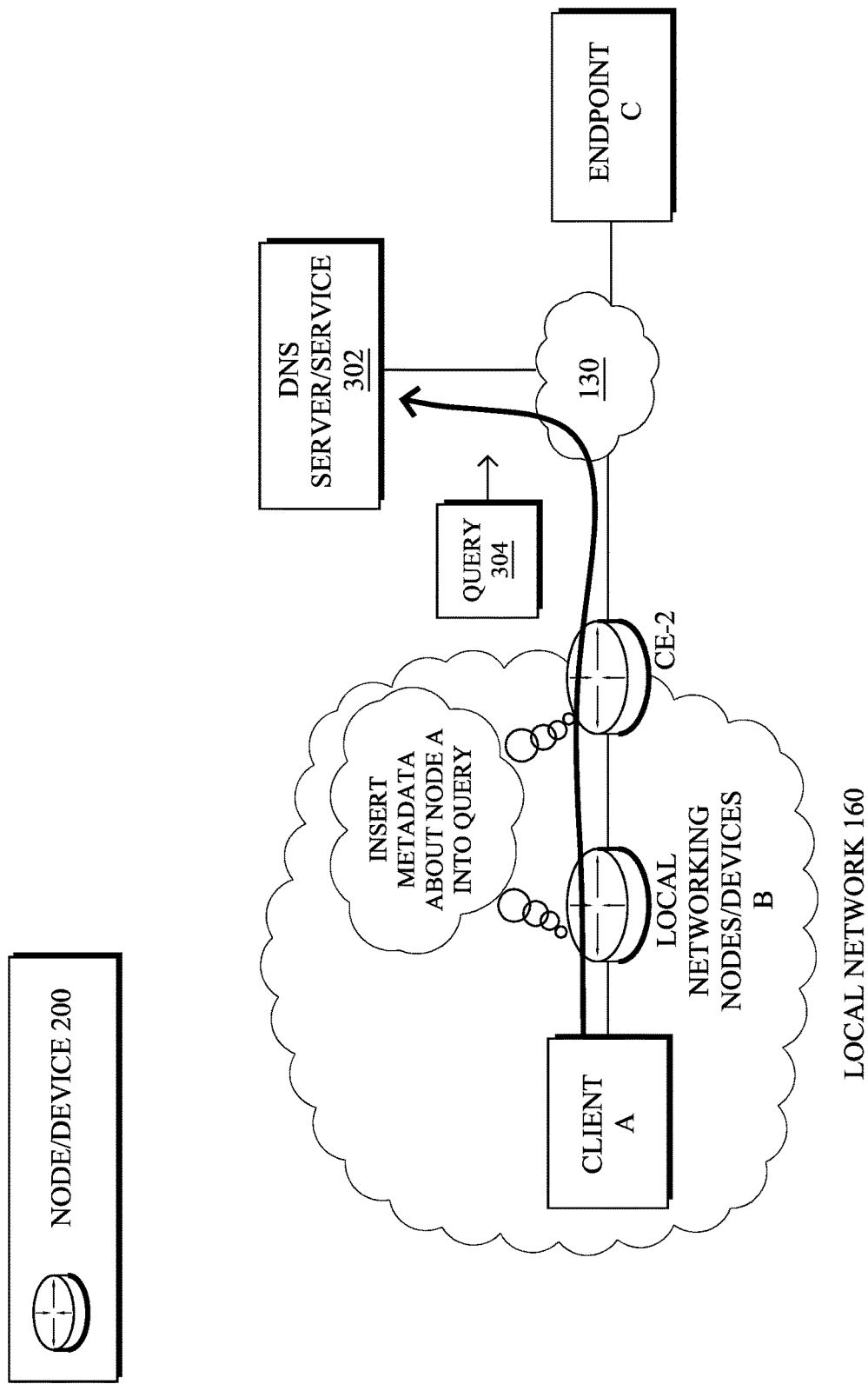

In FIG. 3B, one or more of the network elements in local network 160, such as devices B and/or router CE-2, may intercept the outgoing DNS query 304 from node A. In turn, in various embodiments, the intercepting device may insert metadata regarding node A into DNS query 304 before sending DNS query 304 on to DNS service 302. As noted, for example, this metadata may be specified using their respective codes in the RDATA section of the OPT RR of DNS query 304. Table 1 below illustrates example metadata regarding node A that may be inserted into DNS query 304:

TABLE 1

| Name | Number | Type |
| --- | --- | --- |
| User Level | 1001 | Integer |
| User Traffic | 1002 | Map |
| User Address | 1003 | IP Address |
| User Location | 1004 | Integer |
| Manufacturer | 1005 | Bit String |
| Suspicious | 1006 | Integer |

The User Level metadata may represent the level or category of the specific user of the node that sent the DNS query (e.g., node A in FIG. 3B). This may be arbitrarily set, depending on the specific needs of the network. For example, a basic case may be to set this as "0" for contingent workers and guests and "1" for full-time employees. In another example, high ranking employees (e.g., the CEO, network managers, etc.) can be flagged using this field to afford them additional privileges in the network. In further embodiments, this field may convey a unique user identifier for the specific user, allowing for policy control down to the user level, or even uniquely identify a specific session or application among many the user may be running concurrently (for example, if multiple applications windows are open).

To determine the user level, the inserting device may leverage authentication, authorization, and accounting (AAA), mechanisms, such as 802.1x, which may already be present in the network. That is, the network authorization system can push the user level code into the network, such as to devices B and/or router CE-2. Alternatively, or in addition thereto, the device intercepting the DNS query cart perform a lookup of the user via the AAA system, to determine level of the particular user associated with the node that issued the DNS query. The levels can also be configured within the DNS service (e.g., DNS service 302), and based on the requesting user level, the service may return alternate lookup results (e.g., NXDOMAIN [no such domain] responses, certain sites, or return captive portal links).

The User Traffic metadata may comprise a mapping of traffic classes to their respective counts. For example, such mappings may be of the form {"class": value}, with the classes being specified using numeric codes. Example traffic classes may include, e.g., any or all of the following;
 0: time window for class statistics
 1: total traffic
 2: total traffic for a given domain (e.g., the queried domain in DNS query 304)
 3: total traffic for the given domain category (if known by the inserting device)
 4: peak bandwidth statistics for a given domain
 5: peak bandwidth statistics for a given domain category
 6: latency statistics for a given domain, which could be of particular interest in IoT implementations
 7: latency statistics for a given domain category The values of any of the above traffic classes can then be used to apply a DNS-based policy to the node that issued the DNS query, based on how much traffic the node has sent in a given time window. Note that the above traffic classes are illustrative only and that any number and/or different types of traffic classes may be represented in the user traffic metadata inserted into the DNS query. In further embodiments, if the device inserting the metadata into the DNS query also has knowledge about the domain being queried, it can also encode this information in the metadata of the DNS query, as well.

The User Address metadata may indicate the IP or other network address of the requesting node (e.g., that of node A in FIG. 3B). Note that in implementations where the DNS service is cloud-based, the address of the node may otherwise appear in an altered form after network address translation (NAT). In such cases, this metadata field can be used to convey the original address of the node for purposes of applying a network policy to it. In addition, based on network segmentation, different network policies could be applied (e.g., as a function of the originating subnet of the request, etc.).

The User Location metadata may indicate the location of the requesting node. In some cases, this field could be encoded as an integer or other identifier. For example, in some cases, this field may include the country code of origin of the node. This can be used, e.g., to enforce difference policies on different regions, especially if the node is a mobile node. For example, the U.S. country code could be encoded as in hexadecimal ASCII a 0x5553. In further embodiments, more fine-grained geolocation information can be encoded in the location metadata. For example, the device inserting the location metadata may do so based on wireless triangulation of the node. Global Positioning System (GPS) information, precision indoor location service, or the like. Generally, the location metadata allows the DNS service to provide some level of geo-fencing for the node, based on its location. For example, there may be laws in certain regions that govern content. Based on that, the DNS service may cause the network devices to instantiate a policy that redirects certain requests from the node to a splash page or proxy, or to simply block the content outright (e.g., by responding to the DNS query with an NXDOMAIN reply, etc.).

The Manufacturer metadata indicate the organizationally unique identifier (OUI) of the node's manufacturer and/or any additional manufacturer/vendor data available to the network. For example, in one embodiment, the network may obtain this information from a Manufacturer Usage Description (MUD) file, from profiling the node, from the node itself, and/or from any other source. Details regarding MUD can be found in the IETF draft, entitled "Manufacturer Usage Description Specification" by E. Lear et al. This allows the DNS service to be aware of the client's manufacturer and make resolution or policy decisions based on that data. Hardware, firmware, middleware, and/or application software version numbers could also be part of this metadata. This could add an additional layer of security on top of MUD in the IoT cases or provide a layer of security for those devices that are not MUD-compliant.

The Suspicious metadata may generally indicate a degree of suspiciousness of the node that issued the DNS query. In some cases, this field may be on a binary scale (e.g., "0" if not suspicious and "1" if suspicious), on a predefined scale (e.g., "1" if not suspicious and "10" if most suspicious), etc. In some embodiments, the value of this field may be based on an analysis of the behavior of the node by a security or other behavioral analyzer in the network. For example, an anomaly detector deployed in the network may assess the traffic behavior of node A, to determine whether the behavior of node A is indicative of malware infection, prohibited user behavior, malfunctions, or the like. By setting this field, reporting aggregation can happen at the cloud level, and it can trigger different policies or results to be returned from the resolver. For example, the user of the node may be redirected to a captive portal to re-authenticate or a lower QoS policy may be pushed from the DNS service back through the network.

Functionally, the above metadata regarding the node can be inserted at any or each level of the network, or at a central location, depending on the network architecture. Generally, any device that intercepts a DNS query may process the DNS packet, add the metadata regarding the source node (e.g., as pseudo-RRs), rewrite checksums, and forward the packets to the DNS service. The type of crypto processing, key length, and other security parameters used by a node could also enter into the level of suspicion calculation.

Figure 3C:
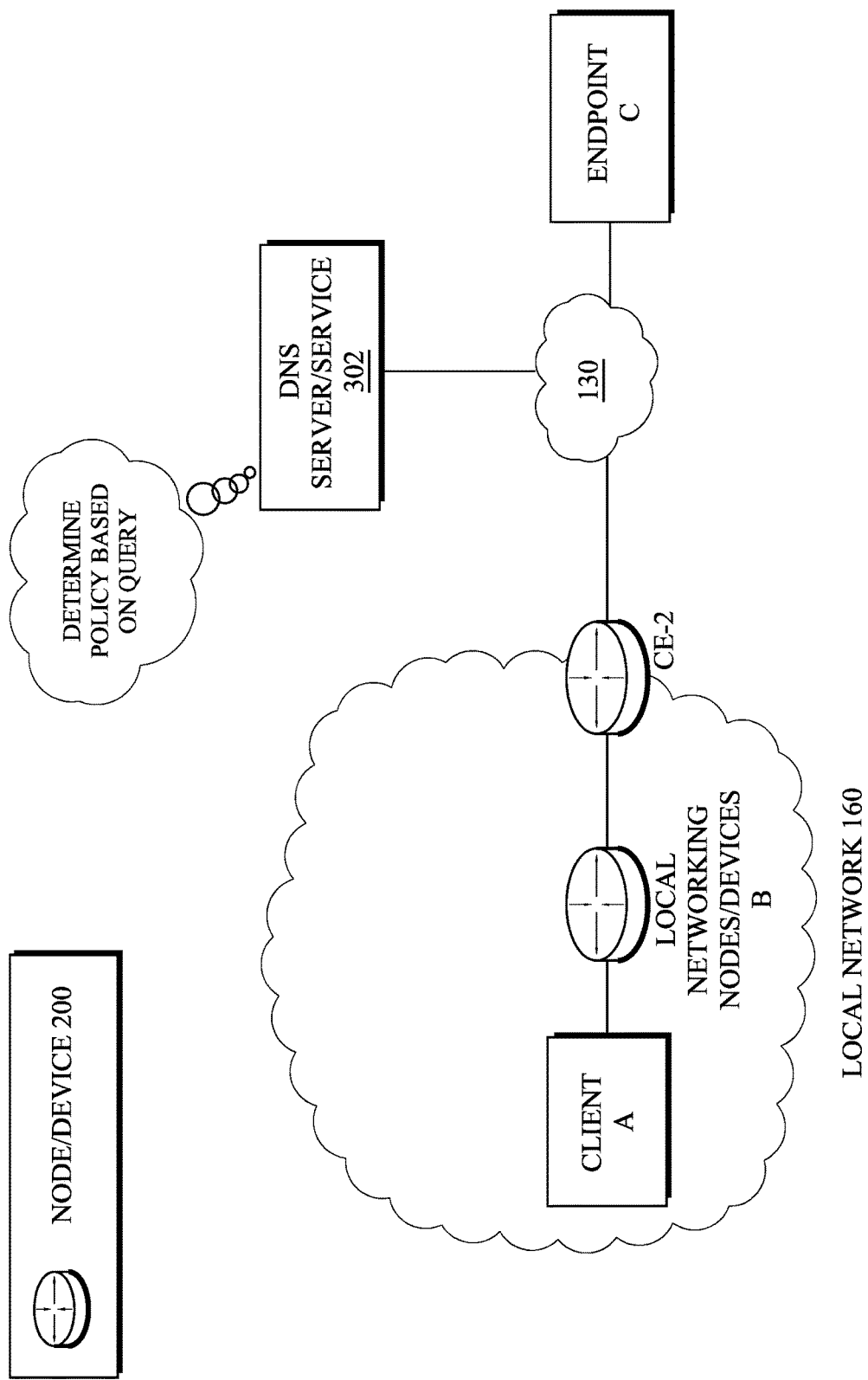

As shown in FIG. 3C, DNS service 302 may determine a network policy based on the received DNS query 304. Notably, based on the metadata in DNS query 304 regarding node A, and potentially based on any additional policy elements configured in DNS service 302, DNS service 302 can generate appropriate network policy information to be used by local network 160. Such network policies may also be in addition to further security functions available at DNS service 302, such as returning an NXDOMAIN within the DNS response (e.g., to block access to certain domains) or cause a redirect to other hosts (e.g., a portal or warning splash page, etc.).

Note that the metadata processing and policy generation functionality can be implemented either directly in the DNS service architecture or, alternatively, as a stand-alone policy server that operates in conjunction with the service that performs the DNS lookup. In the latter case, although implemented on a separate device, the policy server can also be considered to be a component of DNS service 302.

Figure 3D:
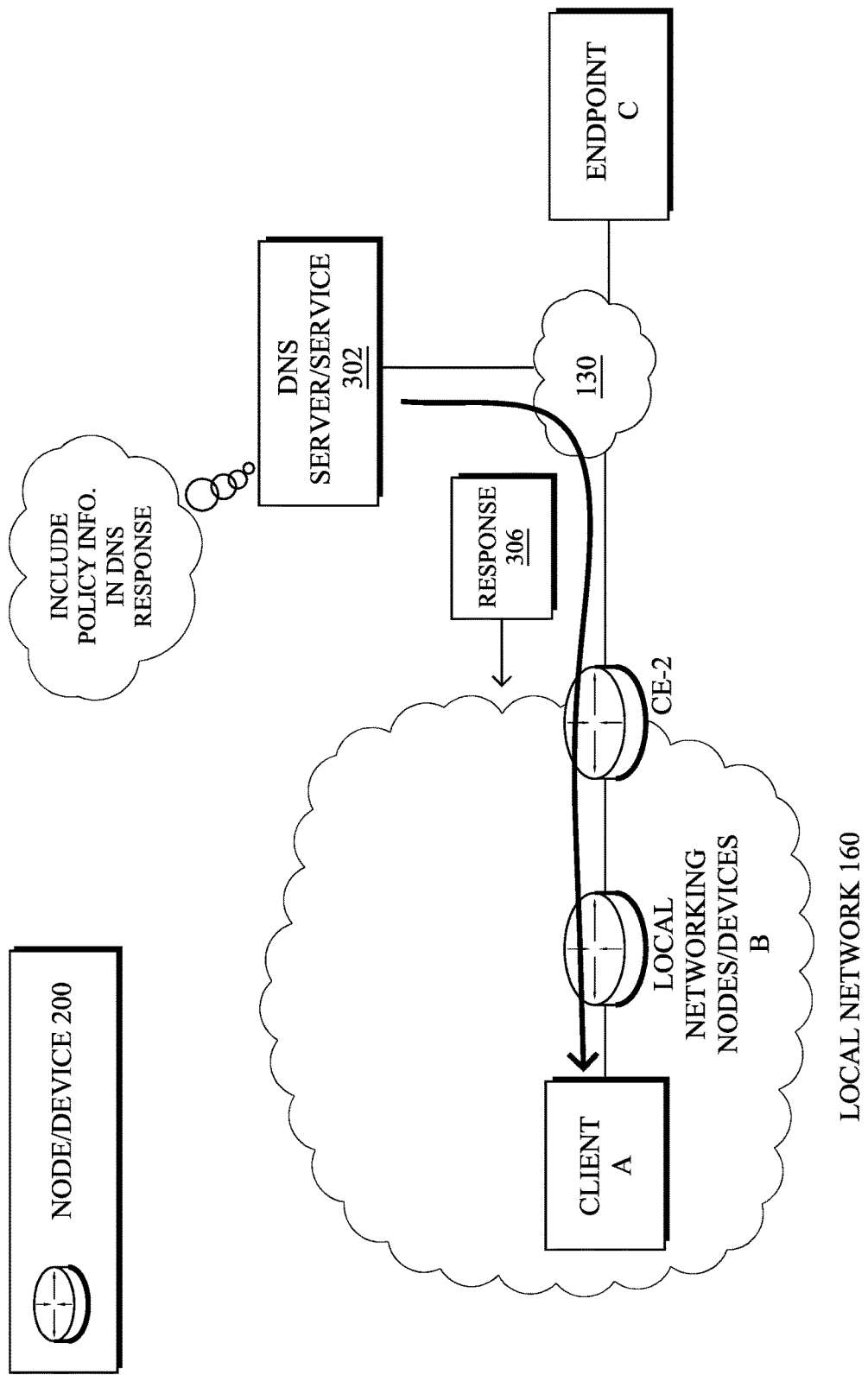

As shown in FIG. 3D, once DNS service 302 has identified the appropriate network policy information for node A and/or the domain queried by node A, DNS service 302 may include this policy information as metadata in its DNS response 306 sent back towards node A, in a similar manner to the insertion of metadata into DNS query 304 (e.g., using OPT RRs, etc.). Table 2 below illustrates example network policy information metadata that may be inserted into DNS response 306:

TABLE 2

| Name | Number | Type |
| --- | --- | --- |
| Time Window | 2001 | Integer |
| DSCP Markings | 2002 | Integer |
| Host/Domain Classification | 2003 | Map |
| Risk Level | 2004 | Integer |

The Time Window metadata may indicate the start and end times during which the requesting node is allowed to communicate with the IP address(es) included in the DNS response. For example, as shown, DNS response 306 may indicate the time period during which node A is allowed to communicate with the address of endpoint C, which is identified by DNS service 302 based on a lookup of the domain requested in DNS query 304. In other words, the time window metadata can be used to indicate to network 160 that a "channel" should be carved out specifically for the specific bi-directional traffic flow between nodes A and C, for a specific amount of time. This can be used to lock down the network so that stray packets sent outside of this time window can be shutdown, as well as providing the network an understanding of how long flow resources will be needed. In a software defined network (SDN), this can trigger signaling to a controller to optimize the traffic flow through the network based on overall flow resources, in a further embodiment.

The DSCP Markings metadata may include the Differentiated Services Code Point (DSCP) values to be used by the devices of network 160 when processing traffic between node A and endpoint C. In other words, this metadata allows the QoS markings to be centralized in the DNS service itself and be based on any or all of the metadata regarding the client node (e.g., node A) that was inserted into the DNS query issued by that client (e.g., User Level, Suspicious, User Location, etc.). As an example, a user with a high User Level (e.g., the CEO), an expedited forwarding (EF) code point might be pushed to the network for the flows corresponding to the lookup. Again, in an SDN, a controller can use this additional information to make overall network routing and resource decisions.

The Host/Domain Classification metadata may map classifications codes for the host/node, and/or the domain requested by the node, to their corresponding types. For example, this can be used to specify the category of a site (and its opcode value) along with the service name (e.g., Dropbox) and its opcode value. Example classifications are as follows:

0: Category (e.g., "Business/Technology," "Adult Content," etc.)

1: Cloud Service (e.g., "Dropbox," "iTunes," etc.)

Sub-classifications are also possible, such as the following:

0: opcode value

1: category or service name

For example, 0:{0:12,1: "Politics} could be used to represent the classification metadata for a website devoted to politics. Similarly, 0:{0:1,2, "Dropbox"} could be used to convey the classification for the "Dropbox" service.

Such classification metadata can be used in local network 160 to augment traffic account methodologies, such as IPFIX or NetFlow. For example, in a Flexible NetFlow (FNF) export, a new record can be added so that analytics systems can do further correlation based on flow domain and flow category. This additional code value can then be passed back to the cloud service for subsequent queries to let the cloud know how much traffic a given user has passed for a given category or cloud-based service. Such information can allow traffic quota policies to be enforced.

The Risk Level metadata may indicate the potential "danger" that the requested domain represents and can be used to signal the appropriate security actions to be taken (e.g., to sanitize or block traffic associated with the domain, etc.). The opposite is also true, e.g., the network may bypass deeper security checks on traffic associated with a low-risk site (e.g., bypassing deep packet inspection, etc.). Again, this can help in an SDN to pre-setup things like Service Function Paths (SFPs), to specifically handle this flow for a specific time window.

Figure 3E:
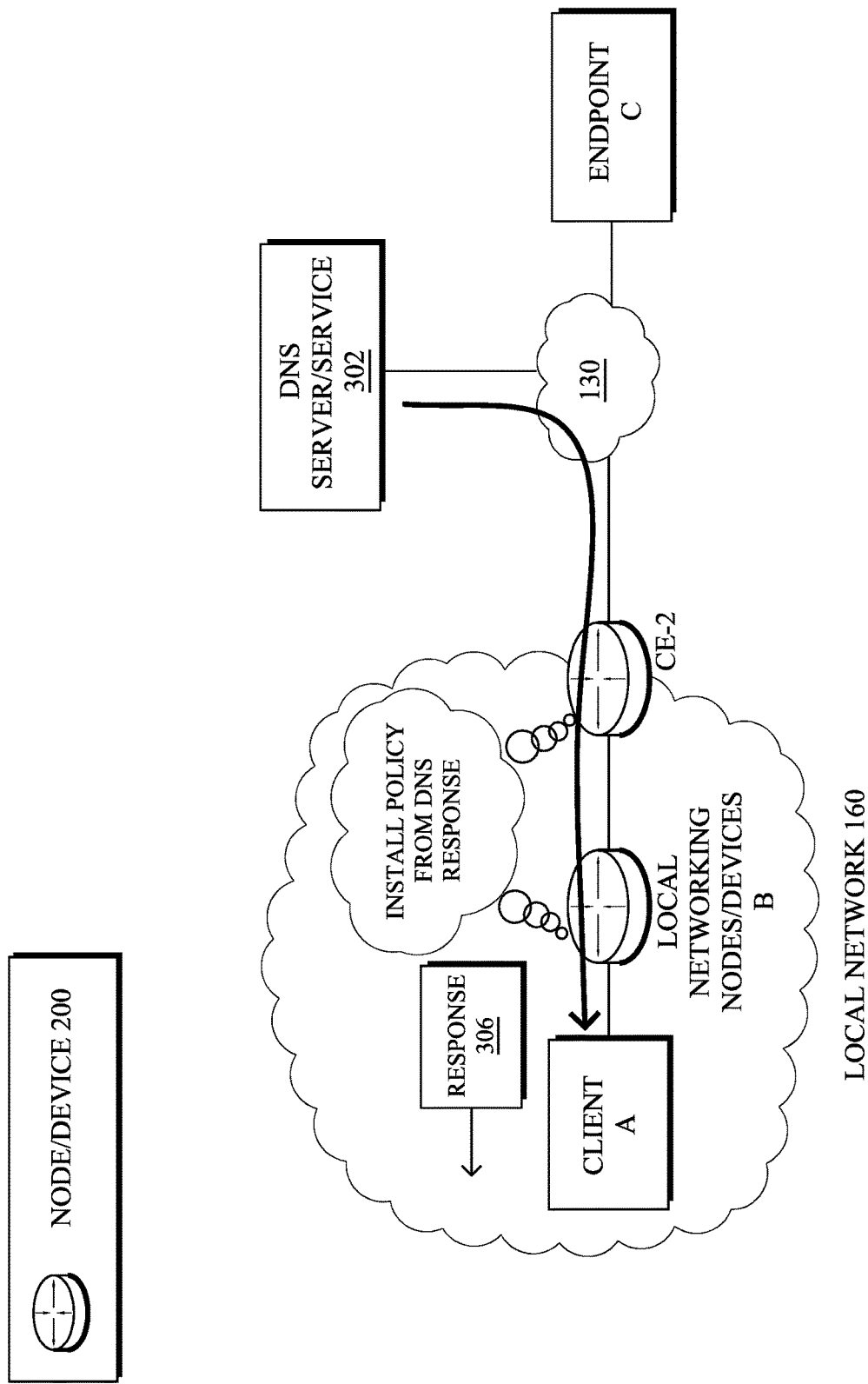
Figure 3F:
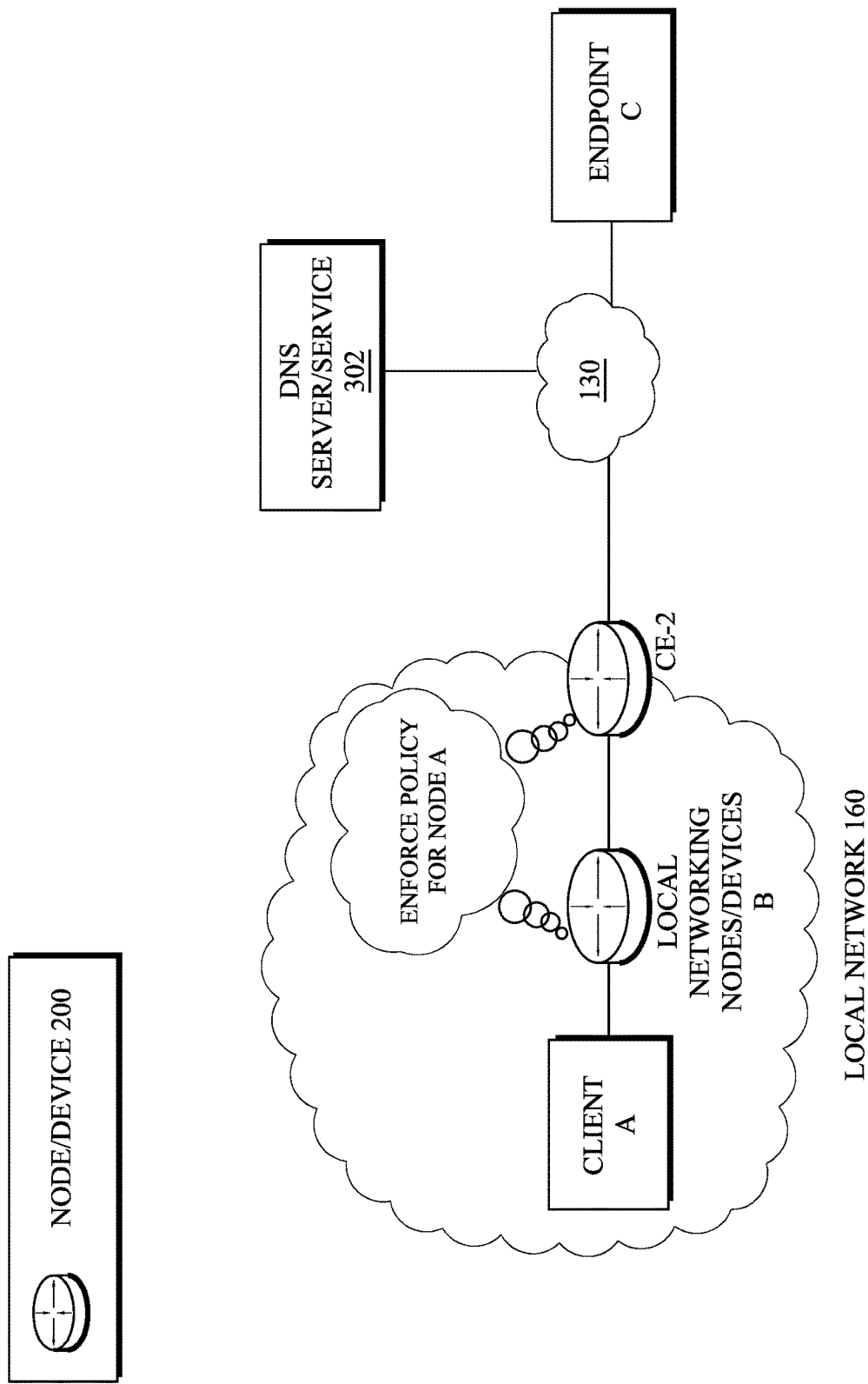

As shown in FIG. 3E, the networking device(s) B and/or router CE-2 may intercept DNS response 306 and assess the network policy information included as metadata, to determine and install an appropriate network policy for network 160. For example, the time window and DSCP markings metadata fields may be used to implement a QoS policy for node A during a certain time window and/or for traffic between node A and node C (e.g., based on the classification and/or risk metadata fields). In turn, as shown in FIG. 3F, the intercepting device(s) may then enforce the network policy within network 160 with respect to node A and/or the domain associated with endpoint node C.

Note that since RFC6891 specifies that OPT RRs are not to be cached, the network devices in network 160 may learn the metadata values dynamically, allowing for a more fluid and up-to-date application of policy decisions. Functionally, each hop within network 160 can inspect these reply OPT RRs in DNS response 306 sent back to node A. This allows for a very "deep" application of the network policy. However, in certain network architectures, such as a controller-based SDN, the gateway router may forward the DNS response 306 to the controller, to enforce the policy network-wide.

As would be appreciated, many different metadata fields and functions could be used in further embodiments of the DNS-based policy signaling described above. For example, custom fields could be created for class of service/QoS parameters. Application-specific content could also be added, e.g., to support analytics, fault tolerance, privacy, load balancing, geographic limits, etc.

By way of a more real-world example, consider the case in which a user is attempting to access a certain database service while physically located in his company's building. In such a case, information about the user, his location, and/or his device may be inserted into the DNS query issued for the database service. In response, the DNS service may return policy information as part of its DNS response for the database service that indicates a geofence around the building for access to the database service. If the user then leaves the building and again attempts to access the database service (e.g., from a coffee shop across the street and via the local network of the company), the network may enforce this geolocation-based policy, to deny the user access to the database service.

In another example of the techniques herein, the suspicious metadata field may be used in conjunction with, the other fields about the user of the node, to install an appropriate network policy. For example, assume that the network traffic attributed to the device of a researcher is anomalous when compared to other users in the network. Even though suspicious, the additional information about the user (e.g., that the user is in a researcher user category) may exempt the user from certain security policies.

Figure 4:
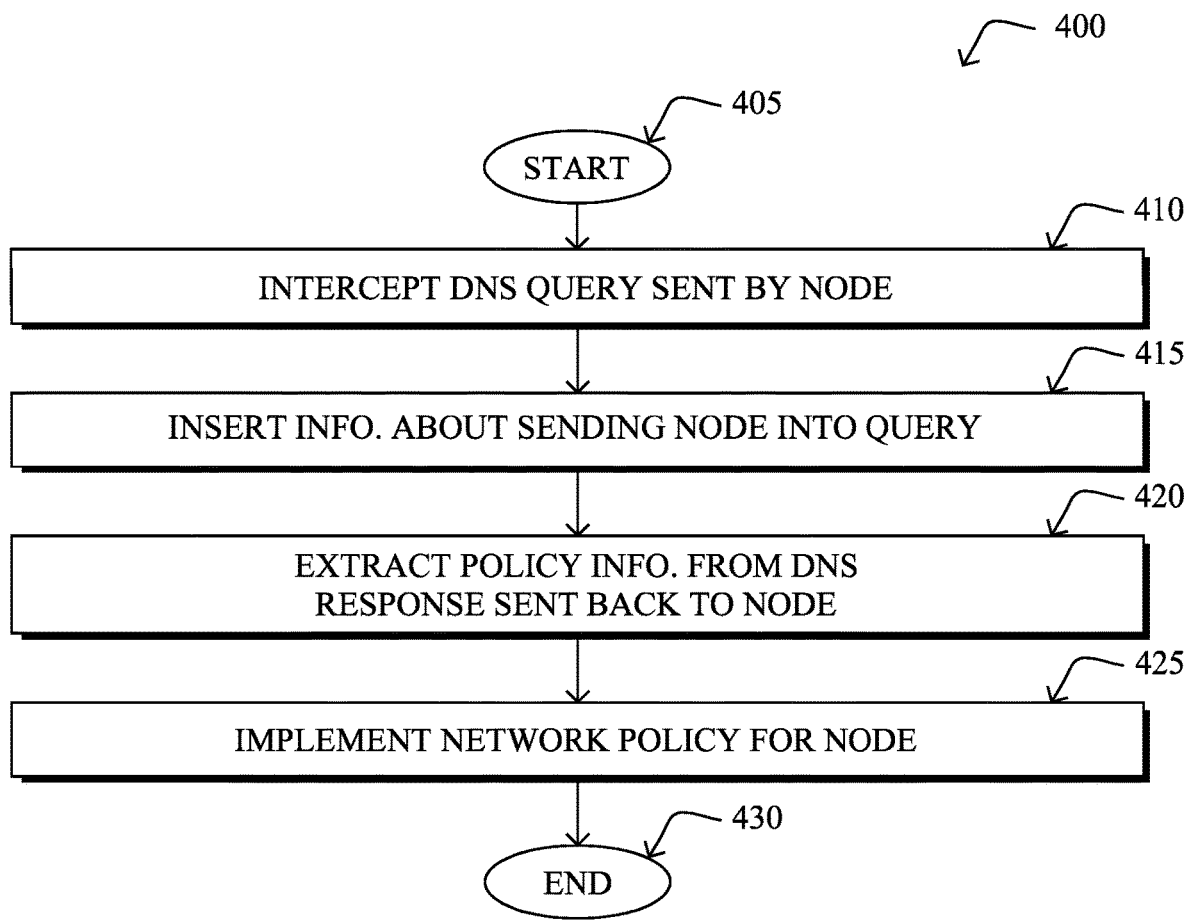
FIG. 4 illustrates an example simplified procedure for applying a network policy to a node.

FIG. 4 illustrates an example simplified procedure for applying a network policy to a node in a network, in accordance with one or more embodiments described herein. For example, a non-generic, specifically configured device (e.g., device 200), such as a router, switch, server, or other networking device, may perform procedure 400 by executing stored instructions (e.g., process 248). The procedure 400 may start at step 405, and continues to step 410, where, as described in greater detail above, the device may intercept a DNS query sent by a node in the network to a DNS service. For example, such a query may request a network address associated with a domain indicated by the query.

At step 415, as detailed above, the device may insert metadata information about the node into the DNS query before sending the DNS query on to the DNS service. For example, such metadata information may indicate any or all of the following: the user associated with the node, a user level for the user, a location of the node, an address of the node, traffic information regarding the node and/or the requested domain, or the manufacturer and/or model of the node. In further embodiments, the metadata may include an indication as to whether the behavior exhibited by the node in the network is suspicions. Any or all of this metadata may then be used, in turn, by the DNS service to return network policy information to the device (e.g., by performing procedure 500 described below).

At step 420, the device may extract network policy information regarding the node from a DNS response sent from the DNS service back to the node, as described in greater detail above. Such policy information may indicate, for example, a time window during which the policy should be applied and/or parameters that control the QoS settings for traffic associated with the node and/or the requested domain (e.g., DSCP markings, etc.). In further cases, the DNS response may include metadata that controls a security policy applied to the node and/or domain, such as category information for the domain that the node is attempting to access or a risk level for the domain.

At step 425, as detailed above, the device may implement a network policy for the node within the network based on the policy information extracted from the DNS response. For example, such a policy may be a QoS policy that controls how the traffic associated with the node and/or domain is treated in the network. In another example, the policy may be a security policy that quarantines traffic associated with the node or domain, subjects the traffic to additional screening, drops or blocks the traffic, or redirects the node to a portal. Procedure 400 then ends at step 430.

Figure 5:
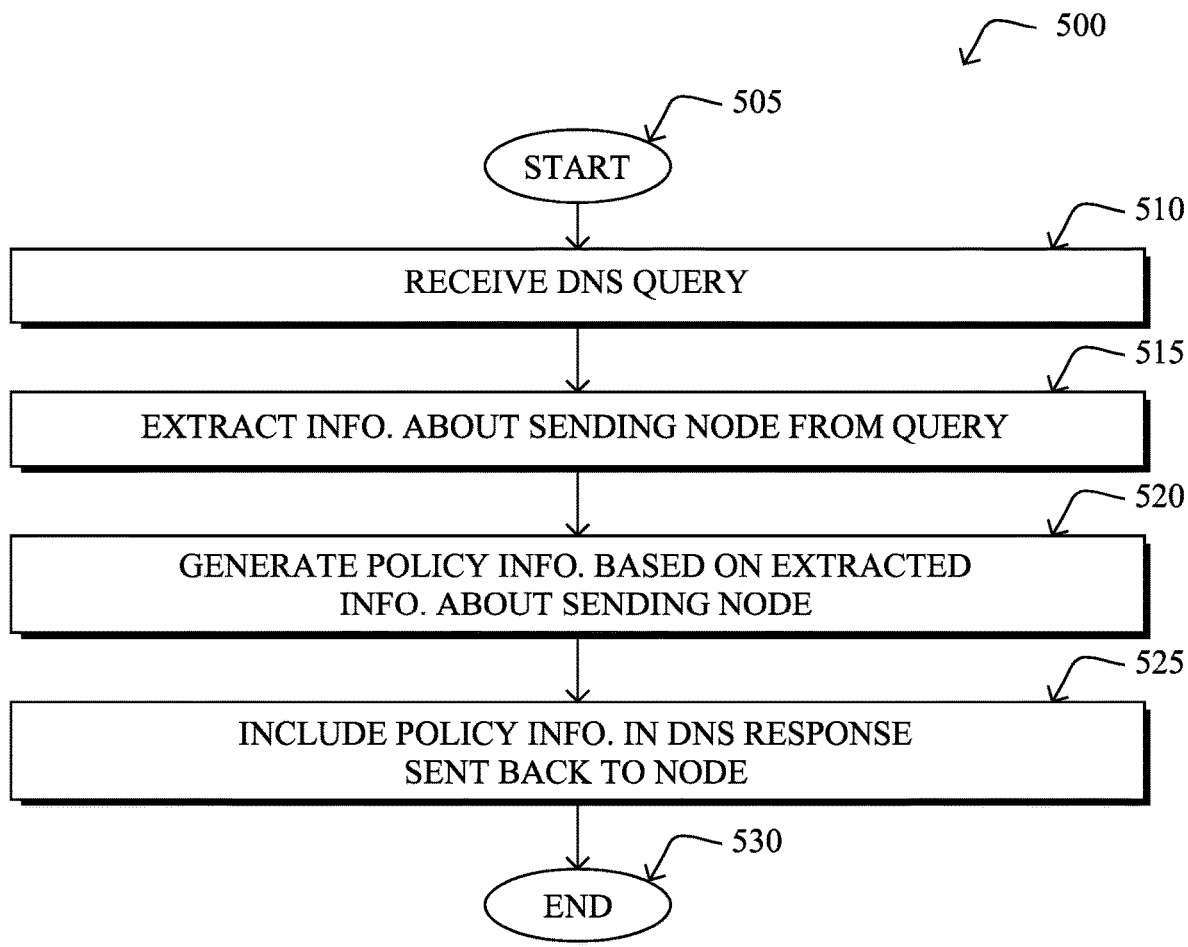
FIG. 5 illustrates an example simplified procedure for including policy information in a DNS response.

FIG. 5 illustrates an example simplified procedure for including policy information in a DNS response, according to various embodiments. For example, a non-generic, specifically configured device, such as a device that implements a DNS service, may perform procedure 500 by executing stored instructions. Procedure 500 may start at step 505 and continue on to step 510 where, as described in greater detail above, the DNS service may receive a DNS query sent by a node in a network. In various embodiments, as illustrated above, the DNS query may include metadata information about the node inserted into the DNS query by a device in the network.

At step 515, as detailed above, the DNS service may extract the metadata information about the node from the DNS query. For example, the DNS service may assess the OPT RUs of the DNS query, to extract the metadata regarding the node. For example, the metadata inserted into the DNS query by one or more devices in the network of the node may indicate the user level, location, manufacturer, etc. associated with the node.

At step 520, the DNS service may generate policy information-regarding the node based on the metadata information about the node extracted from the DNS query, as described in greater detail above. In particular, the DNS service may assess the metadata information about the node that issued the DNS query and/or the queried domain to match this data to appropriate policy information. Such policy information may include, for example, a timeframe during which the policy is to be enforced, QoS-related parameters to be applied to the traffic of the node and/or domain, security-related parameters that control how the traffic is to be treated, or the like.

At step 525, as detailed above, the DNS service may include the policy information regarding the node in a DNS response sent back to the node. In turn, the device in the network that included the metadata regarding the node in the DNS query may use the metadata in the DNS response to implement a network policy for the node within the network based on the policy information included in the DNS response. For example, such a policy may be a security policy, QoS policy, or the like. Procedure 500 then ends at step 530.

It should be noted that while certain steps within procedures 400-500 may be optional as described above, the steps shown in FIGS. 4-5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400-500 are described separately, certain steps from each procedure may be incorporated into each other procedure, and the procedures are not meant to be mutually exclusive.

The techniques described herein, therefore, allow for the deployment of network policies in a more centralized manner by leveraging the DNS layer (e.g., using DNS metadata for the signaling). In another aspect, the techniques herein allow for existing network-based analytics to be augmented with information about cloud service and the type of sites being accessed. Additionally, the techniques herein can be used to further refine which sites users are able to access based on their enterprise attributes. Further, the techniques herein provide a way for the network to learn about resource requirements so that the network can properly budget and pre-allocate flows and service paths.

While there have been shown and described illustrative embodiments that provide for DNS metadata-based signaling for network policy control, it is to be understood that various other adaptations and modifications may be made within the spirit and scope of the embodiments herein. For example, while certain embodiments are described herein with respect to using certain protocols are shown, such as DNS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/Flash/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   intercepting, by a device in a network, a Domain Name System (DNS) query sent by a node in the network to a DNS service;
   inserting, by the device, metadata information about the node into the DNS query before sending the DNS query on to the DNS service;
   intercepting, by the device, a DNS response sent from the DNS service back to the node in response to the DNS query;
   extracting, by the device, policy information indicative of a network policy for the node from the DNS response, wherein the DNS service generates the policy information based on the metadata information in the DNS query and includes the policy information in the DNS response;
   determining, by the device, the network policy for the node based on the extracted policy information after intercepting the DNS response; and
   implementing, by the device, the network policy for the node within the network.

2. The method as in claim 1, wherein the metadata information about the node indicates suspicious behavior exhibited by the node in the network, and wherein the network policy for the node comprises a security policy for the node.

3. The method as in claim 1, wherein the network policy comprises a geolocation-based policy for the node, and wherein the network policy is selectively applied to the node based on a geolocation of the node.

4. The method as in claim 1, wherein the policy information indicates a risk level associated with a domain for which the node sent the DNS query, and wherein the network policy controls access to the domain by the node based on the risk level associated with the domain.

5. The method as in claim 1, wherein inserting the metadata information about the node into the DNS query comprises:
including, by the device, the metadata information in the DNS query in an OPT pseudo-resource record.

6. The method as in claim 1, wherein the metadata information about the node indicates a particular user identifier or user category associated with the node, and wherein the policy information is based in part on the user identifier or user category associated with the node.

7. The method as in claim 1, wherein the metadata information about the node indicates a mapping of a class of traffic associated with the node to gather information for the class of traffic.

8. A method comprising:
receiving, at a domain name system (DNS) service, a DNS query sent by a node in a network, wherein the DNS query includes metadata information about the node inserted into the DNS query by a device in the network;
extracting, by the DNS service, the metadata information about the node from the DNS query;
generating, by the DNS service, policy information indicative of a network policy for the node based on the metadata information about the node extracted from the DNS query; and
including, by the DNS service, the policy information in a DNS response sent back to the node, wherein the device determines the network policy for the node based on the policy information included in the DNS response after intercepting the DNS response and implements the network policy for the node within the network.

9. The method as in claim 8, wherein the metadata information about the node indicates suspicious behavior exhibited by the node in the network, and wherein the network policy information indicates a security action that should be performed with respect to the node.

10. The method as in claim 8, wherein the network policy information indicates a geolocation-based policy for the node, and wherein the network policy is selectively applied to the node based on a geolocation of the node.

11. The method as in claim 8, wherein the policy information indicates a risk level associated with a domain for which the node sent the DNS query, and wherein the network policy controls access to the domain by the node based on the risk level associated with the domain.

12. The method as in claim 8, wherein extracting the metadata information about the node from the DNS query comprises:
extracting, by the device, the metadata information from an OPT pseudo-resource record of the DNS query.

13. The method as in claim 8, wherein the metadata information about the node indicates a particular user identifier or user category associated with the node, and wherein the policy information is based in part on the user identifier or user category associated with the node.

14. The method as in claim 8, wherein the metadata information about the node indicates a mapping of a class of traffic associated with the node to gather information for the class of traffic.

15. The method as in claim 8, wherein the DNS service is a distributed DNS service in the network.

16. An apparatus, comprising:
one or more network interfaces to communicate with a network;
a processor coupled to the network interfaces and configured to execute one or more processes; and
a memory configured to store a process executable by the processor, the process when executed configured to:
intercept a Domain Name System (DNS) query sent by a node in the network to a DNS service;
insert metadata information about the node into the DNS query before sending the DNS query on to the DNS service;
intercept a DNS response sent from the DNS service back to the node in response to the DNS query;
extract policy information indicative of a network policy for the node from the DNS response, wherein the DNS service generates the policy information based on the metadata information in the DNS query and includes the policy information in the DNS response;
determine the network policy for the node based on the extracted policy information after intercepting the DNS response; and
implement the network policy for the node within the network.

17. The apparatus as in claim 16, wherein the metadata information about the node indicates suspicious behavior exhibited by the node in the network, and wherein the network policy for the node comprises a security policy for the node.

18. The apparatus as in claim 16, wherein the policy information indicates a risk level associated with a domain for which the node sent the DNS query, and wherein the network policy controls access to the domain by the node based on the risk level associated with the domain.

19. The apparatus as in claim 16, wherein the apparatus inserts the metadata information about the node into the DNS query by:
including the metadata information in the DNS query in an OPT pseudo-resource record.

20. The apparatus as in claim 16, wherein the metadata information about the node indicates a particular user identifier or user category associated with the node, and wherein the policy information is based in part on the user identifier or user category associated with the node.

* * * * *

UNITED STATES PATENT AND TRADEMARK OFFICE
CERTIFICATE OF CORRECTION

Page 1 of 2

PATENT NO. : 10,897,475 B2
APPLICATION NO. : 15/673907
DATED : January 19, 2021
INVENTOR(S) : Joseph Michael Clarke It is certified that error appears in the above-identified patent and that said Letters Patent is hereby corrected as shown below:

In the Specification

Column 1, Line 31, please amend as shown:
indicate identically or functionally similar elements, of Column 3, Line 13, please amend as shown:
via one or more links exhibiting very different network and Column 3, Line 48, please amend as shown:
3.) Site Type C: a site of type B (e.g., types B1, B2 or B3)

Column 4, Line 30, please amend as shown:
of network in which both the routers and their intercon- Column 4, Line 31, please amend as shown:
nect are constrained: LLN routers typically operate with Column 5, Line 35, please amend as shown:
executed by the processor(s), functionally organizes Column 5, Line 36, please amend as shown:
node by, inter alia, invoking network operations in support Column 5, Line 60, please amend as shown:
ate-System-to-Intermediate-System, "IS-IS"), the Border Gateway Protocol (BGP), Column 6, Line 40, please amend as shown:
The techniques herein leverage DNS messaging to provide Signed and Sealed this
Sixth Day of April, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,897,475 B2

Column 6, Line 42, please amend as shown:
of network policies. In some aspects, metadata regarding a Column 8, Line 31, please amend as shown:
(AAA) mechanisms, such as 802.1x, which may already be Column 8, Line 35, please amend as shown:
addition thereto, the device intercepting the DNS query can Column 8, Line 48, please amend as shown:
classes may include, e.g., any or all of the following:

Column 9, Line 22, please amend as shown:
encoded as in hexadecimal ASCII as 0x5553. In further Column 9, Line 26, please amend as shown:
wireless triangulation of the node, Global Positioning Sys- Column 12, Line 34, please amend as shown:
cious metadata field may be used in conjunction with the Column 12, Line 64, please amend as shown:
in the network is suspicious. Any or all of this metadata may Column 13, Line 38, please amend as shown:
the OPT RRs of the DNS query, to extract the metadata regard Column 13, Line 44, please amend as shown:
mation regarding the node based on the metadata informa Column 13, Line 48, please amend as shown:
that issued the DNS query and/or the queried domain, to